US010599413B2

(12) United States Patent
Li

(10) Patent No.: US 10,599,413 B2
(45) Date of Patent: *Mar. 24, 2020

(54) METHOD AND DEVICE FOR IDENTIFYING FILE

(71) Applicant: Guangdong Oppo Mobile Telecommunications Corp., Ltd., Dongguan, Guangdong (CN)

(72) Inventor: Hui Li, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/119,155

(22) Filed: Aug. 31, 2018

(65) Prior Publication Data

US 2018/0364999 A1 Dec. 20, 2018

Related U.S. Application Data

(63) Continuation of application No. PCT/CN2017/086544, filed on May 31, 2017.

(30) Foreign Application Priority Data

May 31, 2016 (CN) .......................... 2016 1 0380642

(51) Int. Cl.
G06F 8/61 (2018.01)
G06F 9/445 (2018.01)
(52) U.S. Cl.
CPC .............. *G06F 8/61* (2013.01); *G06F 9/445* (2013.01)
(58) Field of Classification Search
None
See application file for complete search history.

(56) References Cited

U.S. PATENT DOCUMENTS 6,289,512 B1 * 9/2001 Edwards .................. G06F 8/61
717/178
6,769,115 B1 * 7/2004 Oldman .................. G06F 8/36
717/121
(Continued)

FOREIGN PATENT DOCUMENTS

CN 102902687 A 1/2013
CN 103646047 A 3/2014
(Continued)

OTHER PUBLICATIONS

Anonymous: "How does one find the start of the "Central Directory" in zip files?", Jan. 26, 2011 (Jan. 26, 2011), pp. 1-3, XP055563463, Retrieved from the Internet: URL: https://stackoverflow.com/questions/4802097/how-does-one-find-the-start-of-the-central-directory-in-zip-files [retrieved on Feb. 28, 2019], pp. 1-3.
(Continued)

*Primary Examiner* — Philip Wang
*Assistant Examiner* — Rongfa P Wang
(74) *Attorney, Agent, or Firm* — Young Basile Hanlon & MacFarlane, P.C.

(57) ABSTRACT

A method for identifying a file is provided. The method includes the following operations. An installation file and an end tag position of a file directory of the installation file are acquired. A start tag position of the file directory is determined according to the end tag position of the file directory. A file header identifier in the file directory is queried for according to the start tag position of the file directory and a file indicated by the file header identifier is identified via analyzing the file header identifier.

18 Claims, 4 Drawing Sheets

(56) References Cited

U.S. PATENT DOCUMENTS

| | | | |
|---|---|---|---|
| 8,024,382 B2* | 9/2011 | Evans | G06F 16/113 |
| | | | 707/821 |
| 2004/0044996 A1* | 3/2004 | Atallah | G06F 8/71 |
| | | | 717/169 |
| 2010/0242037 A1* | 9/2010 | Xie | G06F 8/61 |
| | | | 717/178 |
| 2011/0099516 A1* | 4/2011 | Hughes | G06F 8/61 |
| | | | 715/810 |
| 2013/0047149 A1* | 2/2013 | Xu | G06F 8/61 |
| | | | 717/175 |
| 2013/0191352 A1 | 7/2013 | Barsness et al. | |
| 2015/0220317 A1 | 8/2015 | Li et al. | |
| 2016/0378458 A1* | 12/2016 | Pan | G06F 11/1433 |
| | | | 717/169 |

FOREIGN PATENT DOCUMENTS

| | | |
|---|---|---|
| CN | 104199673 A | 12/2014 |
| CN | 104572966 A | 4/2015 |
| CN | 104573514 A | 4/2015 |
| CN | 104866504 A | 8/2015 |
| CN | 105278989 A | 1/2016 |

OTHER PUBLICATIONS

Anonymous: "Zip (file format)—Wikipedia", May 5, 2016 (May 5, 2016), pp. 1-8, XP055563451, Retrieved from the Internet: URL: https://en.wikipedia.org/w/index.php?title=Zip_(file format)&oldid=718838848 [retrieved on Feb. 28, 2019], the whole document.

Anonymous: "Android application package—Wikipedia", May 24, 2016 (May 24, 2016), pp. 1-4, XP055563458, Retrieved from the Internet: URL: https://en.wikipedia.org/w/index.php?title=Android_application_package&direction=next&oldid=721880555 [retrieved on Feb. 28, 2019], the whole document.

Extended European search report issued in corresponding European application No. 17805842.6 dated Mar. 13, 2019.

\* cited by examiner

METHOD AND DEVICE FOR IDENTIFYING FILE

CROSS-REFERENCE TO RELATED APPLICATION(S)

This application is a continuation of International Application No. PCT/CN2017/086544, filed on May 31, 2017, which claims priority to Chinese Patent Application No. 201610380642.8, filed on May 31, 2016, the contents of both of which are hereby incorporated by reference in their entireties.

TECHNICAL FIELD

This disclosure relates to the field of electronic technology, and particularly to a method and device for identifying a file.

BACKGROUND

Currently, more and more applications are supported by smart terminals, but it is also accompanied by a decrease in the boot speed, leading to longer boot time required for the smart terminal and longer installation time for applications. When the smart terminal is booted or an application is installed, an Android Package (i.e., APK file) of the application needs to be scanned. As the APK file itself is a zip package, when scanning the APK file, all files in the APK file need to be decompressed to identify a native library file and a RenderScript file stored in the APK file. Then the native library file and the RenderScript file are traversed to achieve the scanning. However, in the process of traversing the native library file and the RenderScript file, a lot of scan time will be consumed, resulting in increased time to boot or install applications.

SUMMARY

The disclosure provides a method for identifying a file and related devices, which can identify a file indicated by a file header identifier via scanning the file header identifier of an installation file, thereby reducing scan time of the installation file before booting or installing an application.

According to a first aspect of the disclosure, a method for identifying a file is provided. The method includes the follows.

An installation file and an end tag position of a file directory of the installation file are acquired. A start tag position of the file directory is determined according to the end tag position of the file directory. A file header identifier in the file directory is queried for according to the start tag position of the file directory and a file indicated by the file header identifier is identified via analyzing the file header identifier.

According to a second aspect of the disclosure, a device for identifying a file is provided. The device includes at least one processor and a computer readable storage coupled to the at least one processor and storing at least one computer executable instruction thereon which, when executed by the at least one processor, cause the device to carry out actions of the method for identifying a file of the first aspect.

According to a third aspect of the disclosure, a non-transitory computer readable storage medium is provided. The non-transitory computer readable storage medium stores a computer program which, when executed by a processor, causes the processor to carry out actions of the method for identifying a file of the first aspect.

BRIEF DESCRIPTION OF THE DRAWINGS

To describe technical solutions in the implementations of the present disclosure more clearly, the following briefly introduces the accompanying drawings required for describing the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Figure 1:
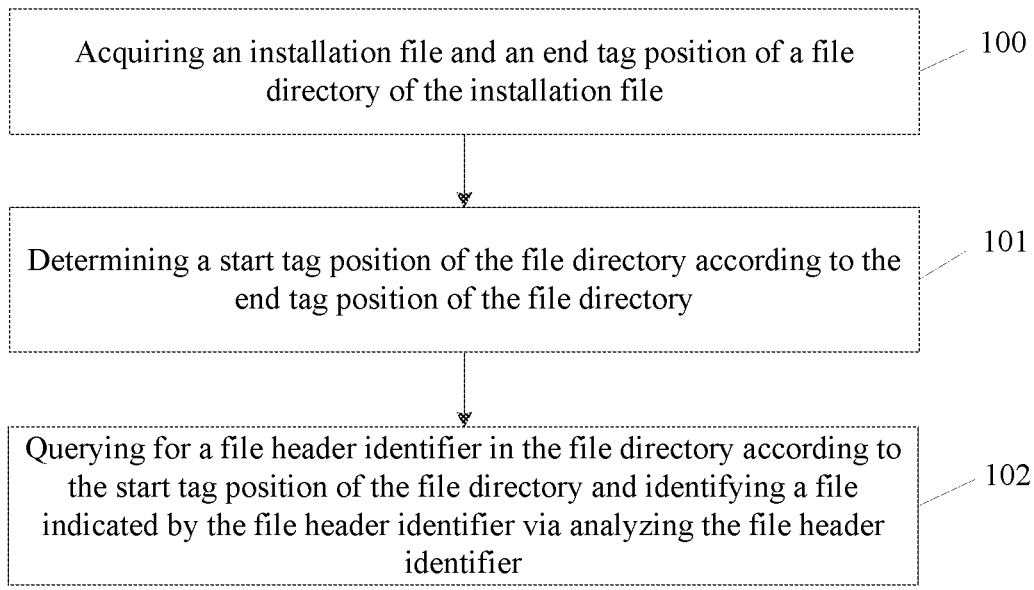
FIG. 1 is a schematic flow chart illustrating a method for identifying a file according to an implementation of the disclosure.

Technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

By adopting the implementations of the disclosure, a file indicated by a file header identifier can be identified via scanning the file header identifier of an installation file and scan time of the installation file before booting a mobile terminal or installing an application can be reduced.

The terms "first", "second", "third", "fourth", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

Terms mentioned in this context are given below.

Dynamic-link library (DLL) is a module that contains functions and data that can be used by another module (application or DLL). A DLL can define two kinds of functions: exported and internal. The exported functions are intended to be called by other modules, as well as from within the DLL where they are defined. Internal functions are typically intended to be called only from within the DLL where they are defined. Although a DLL can export data, its data is generally used only by its functions. However, there is nothing to prevent another module from reading or writing that address.

RenderScript: it is currently an android based framework which is used for running applications that perform very highly computational tasks. RenderScript is extremely useful for applications which perform following types of actions: 3D Rendering, image processing, computational photography, and computer vision.

Library: it is structurally the same as an application (app) module. It provides everything you need to build your app, including source code, resource files, and manifests.

According to implementations of the disclosure, a method for identifying a file is provided. In this method, an installation file and an end tag position of a file directory of the installation file are acquired respectively. A start tag position of the file directory is determined according to the end tag position of the file directory. A file header identifier in the file directory is queried for according to the start tag position of the file directory and a file indicated by the file header identifier is identified via analyzing the file header identifier.

FIG. 1 is a schematic flow chart illustrating a method for identifying a file according to an implementation of the disclosure. Mobile terminals include, for example, mobile phones, tablets, laptops, palmtops, mobile internet devices (MID), wearable devices such as smart watches (for example, iwatch®), smart bracelets, pedometers and the like, and other terminal devices.

As illustrated in FIG. 1, in this implementation, the method begins at block 100.

At block 100, an installation file and an end tag position of a file directory of the installation file are acquired.

As one implementation, when booting a mobile terminal or installing an application, the installation file of the application needs to be acquired and a structure of the file directory in a format of the installation file needs to be extracted to achieve a partial scan. The applications are indicated by various files in the file directory. The file directory contains file header identifiers each for indicating a file. Various files can be identified via scanning the file header identifiers. Consequently, the operation of decompressing all files in the installation file to identify a native library file and a RenderScript file can be omitted. As the installation file itself is a zip package, the end tag position of the file directory of the zip package can be obtained.

As one implementation, the end tag position of the file directory of the zip package can be at 0x06054b50 of the installation file in a binary format.

At block 101, a start tag position of the file directory is determined according to the end tag position of the file directory.

As one implementation, the mobile terminal can determine the start tag position of the file directory according to the end tag position of the file directory, so as to determine a position range of the file directory in the installation file in the binary format and the start tag position of the file directory in the binary format.

At block 102, a file header identifier in the file directory is queried for according to the start tag position of the file directory and a file indicated by the file header identifier is identified via analyzing the file header identifier.

As one implementation, after determining the position range of the file directory in the installation file in the binary format and the start tag position of the file directory in the binary format, all file header identifiers for indicating files are queried for in a traversal manner according to the start tag position of the file directory. After that, a file list is generated according to all the file header identifiers queried. The files indicated by the file header identifiers are then identified via analyzing each file header identifier in the file list. After completing the process of analyzing the file header identifiers, the application can be initialized when booting the mobile terminal or installing the application.

As one implementation, a position of the file header identifier is at 0x04034b50 of the installation file in the binary format.

According to the implementation, when booting the mobile terminal or installing an application, the installation file and the end tag position of the file directory of the installation file are acquired first. Then the start tag position of the file directory is determined according to the end tag position of the file directory. At last, the file header identifier in the file directory is queried for according to the start tag position of the file directory and the file indicated by the file header identifier is identified via analyzing the file header identifier. In this way, the process of decompressing all files in the installation file can be omitted. Therefore, scan time of the installation file before booting the mobile terminal or installing the application can be reduced, and efficiency of booting the mobile terminal or installing the application can be improved.

Figure 2:
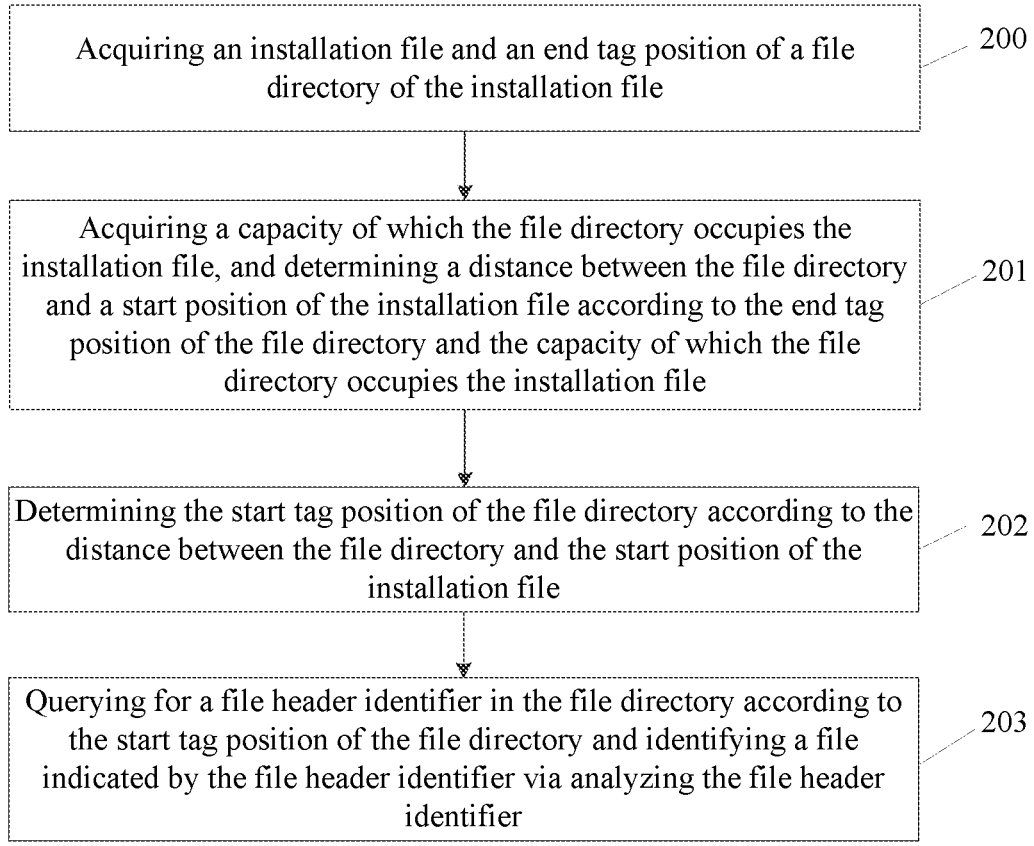
FIG. 2 is a schematic flow chart illustrating a method for identifying a file according to another implementation of the disclosure.

FIG. 2 is a schematic flow chart illustrating a method for identifying a file according to another implementation of the disclosure. Mobile terminals include, for example, mobile phones, tablets, laptops, palmtops, mobile internet devices (MID), wearable devices such as smart watches (for example, iwatch®), smart bracelets, pedometers and the like, and other terminal devices. In the method illustrated in FIG. 2, the operations at block 101 are detailed. Operations at block 101 can be better understood in conjunction with the following descriptions regarding operations at blocks 201 and 202 for example.

As illustrated in FIG. 2, the method begins at block 200.

At block 200, an installation file and an end tag position of a file directory of the installation file are acquired.

As one implementation, when booting a mobile terminal or installing an application, the installation file of the application needs to be acquired and a structure of the file directory in a format of the installation file need to be extracted to achieve a partial scan. The applications are indicated by various files in the file directory. The file directory contains file header identifiers each for indicating a file. Various files can be identified via scanning the file header identifiers. Consequently, the operation of decompressing all files in the installation file to identify a native library file and a RenderScript file can be omitted. As the installation file itself is a zip package, the end tag position of the file directory of the zip package can be obtained.

As one implementation, the end tag position of the file directory of the zip package can be at 0x06054b50 of the installation file in a binary format.

At block 201, a capacity of which the file directory occupies the installation file is acquired, and a distance between the file directory and a start position of the installation file (that is, a distance between the start tag position of the file directory and the start position of the installation file) is determined according to the end tag position of the file directory and the capacity of which the file directory occupies the installation file.

As one implementation, after determining the end tag position of the file directory, the mobile terminal can acquire the capacity (for example, the number of bytes) of which the file directory occupies the installation file. Thereafter, the distance between the file directory and the start position of the installation file is determined according to the end tag position of the file directory and the number of bytes of the file directory occupying the installation file.

At block 202, the start tag position of the file directory is determined according to the distance between the file directory and the start position of the installation file.

As one implementation, after determining the distance between the file directory and the start position of the installation file, the mobile terminal can determine the start tag position of the file directory. For example, the number of bytes of which the file directory occupies the installation file is 12, in this situation, according to the end tag position of the file directory and the occupation of 12 bytes, the offset of the file directory relative to the start position of the installation file is determined as 16 bytes. That is, the start tag position of the file directory is offset by 16 bytes relative to the start position of the installation file, and the capacity of the file directory is 12 bytes.

At block 203, a file header identifier in the file directory is queried for according to the start tag position of the file directory and a file indicated by the file header identifier is identified via analyzing the file header identifier.

As one implementation, after determining the start tag position of the file directory in the binary format, traverse from the start tag position of the file directory to query for all file header identifiers for indicating files. Thereafter, a file list is generated according to all the file header identifiers queried. And then, the file indicated by the file header identifier is identified via analyzing each file header identifier in the file list. After completing the process of analyzing the file header identifiers, the application can be initialized when booting the mobile terminal or installing the application.

As one implementation, a position of the file header identifier is at 0x04034b50 of the installation file in the binary format.

According to the implementation, when booting the mobile terminal or installing the application, the installation file and the end tag position of the file directory of the installation file are acquired first. Then, the start tag position of the file directory is determined according to the end tag position of the file directory. At last, the file header identifier in the file directory is queried for according to the start tag position of the file directory and the file indicated by the file header identifier is identified via analyzing the file header identifier. In this way, it is possible to omit the process of decompressing all files in the installation file. As a result, scan time of the installation file before booting the mobile terminal or installing the application can be reduced, and efficiency of booting the mobile terminal or installing the application can be improved.

Figure 3:
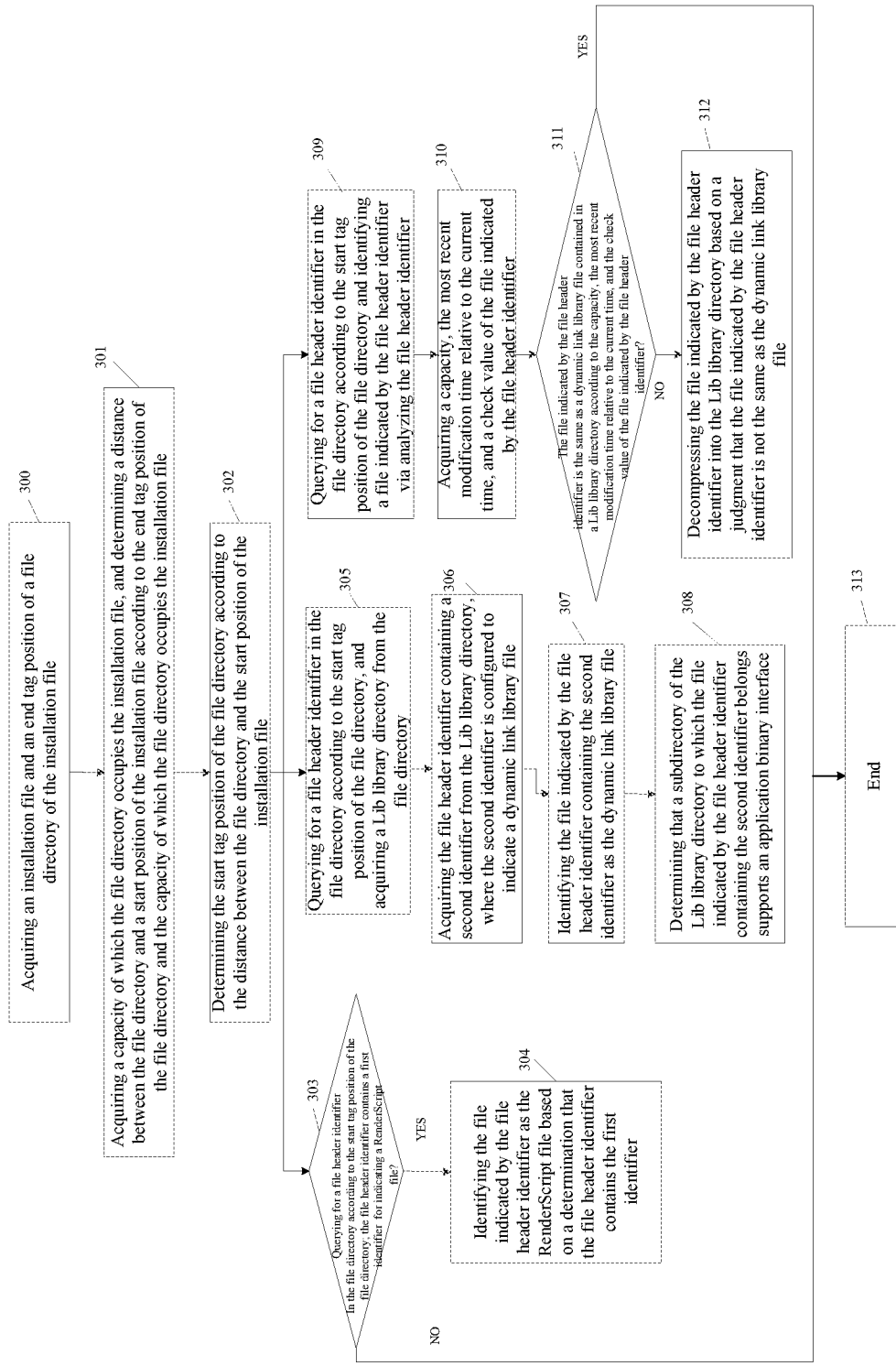
FIG. 3 is a schematic flow chart illustrating a method for identifying a file according to yet another implementation of the disclosure.

FIG. 3 is a schematic flow chart illustrating a method for identifying a file according to yet another implementation of the disclosure. Mobile terminals include, for example, mobile phones, tablets, laptops, palmtops, mobile internet devices (MID), wearable devices such as smart watches (for example, iwatch®), smart bracelets, pedometers and the like, and other terminal devices. Compared with the methods of FIG. 1 and FIG. 2, the method of FIG. 3 describes operations at block 102 or block 203 in detail.

As illustrated in FIG. 3, the method begins at block 300.

At block 300, an installation file and an end tag position of a file directory of the installation file are acquired.

As one implementation, when booting a mobile terminal or installing an application, the installation file of the application needs to be acquired and a structure of the file directory in a format of the installation file needs to be extracted to achieve a partial scan. The applications are indicated by various files in the file directory. The file directory contains file header identifiers each for indicating a file. Various files can be identified via scanning the file header identifiers. Consequently, the operation of identifying a native library file and a RenderScript file by decompressing all files in the installation file can be omitted. Since the installation file itself is a zip package, the end tag position of the file directory of the zip package can be obtained.

As one implementation, the end tag position of the file directory of the zip package can be at 0x06054b50 of the installation file in a binary format.

At block 301, a capacity of which the file directory occupies the installation file is acquired, and a distance between the file directory and a start position of the installation file is determined according to the end tag position of the file directory and the capacity of which the file directory occupies the installation file.

As one implementation, after determining the end tag position of the file directory, the mobile terminal can acquire the capacity (for example, the number of bytes) of which the file directory occupies the installation file. Thereafter, the distance between the file directory and the start position of the installation file is determined according to the end tag position of the file directory and the number of bytes of which the file directory occupies the installation file.

At block 302, the start tag position of the file directory is determined according to the distance between the file directory and the start position of the installation file.

As one implementation, after determining the distance between the file directory and the start position of the installation file, the mobile terminal can determine the start tag position of the file directory. For example, the number of bytes of which the file directory occupies the installation file is 12, in this situation, according to the end tag position of the file directory and the occupation of 12 bytes, the offset of the file directory relative to the start position of the installation file is determined as 16 bytes. That is, the start tag position of the file directory is offset by 16 bytes relative to the start position of the installation file, and the capacity of the file directory is 12 bytes.

At block 303, a file header identifier in the file directory is queried for according to the start tag position of the file directory, and whether the file header identifier contains a first identifier for indicating a RenderScript file is determined.

As one implementation, after determining the start tag position of the file directory in the binary format, all file header identifiers for indicating files are queried for in a traversal manner according to the start tag position of the file directory. After that, a file list is generated according to all the file header identifiers queried. The file indicated by the file header identifier is then identified via analyzing each file header identifier in the file list. Whether the file header identifier contains the first identifier can be determined, where the first identifier can be .bc, configured to indicate the RenderScript file. The mobile terminal can determine whether there is any RenderScript file by judging whether the file header identifier contains the first identifier. If the RenderScript file exists, proceed to block 313; otherwise, the scan process ends.

At block 304, identify the file indicated by the file header identifier as the RenderScript file based on a determination that the file header identifier contains the first identifier.

As one implementation, when the file header identifier contains the first identifier, the file indicated by the file header identifier can be identified as the RenderScript file. Thereafter, a system is notified that there exists the RenderScript file, and identification for the file is completed.

A block 305, a file header identifier in the file directory is queried for according to the start tag position of the file directory, and a Lib library directory is acquired from the file directory.

As one implementation, the mobile terminal generates a file list by determining the file header identifier in the file directory and judges whether there is any Lib library directory in the file directory. If yes, the Lib library directory is acquired.

At block 306, the file header identifier containing a second identifier is acquired from the Lib library directory, where the second identifier is configured to indicate a dynamic link library file.

As one implementation, the Lib library directory contains the file header identifier. The mobile terminal can acquire the file header identifier containing the second identifier from the Lib library directory, where the second identifier can be a .so (shared object), configured to indicate the dynamic link library file.

At block 307, identify the file indicated by the file header identifier containing the second identifier as the dynamic link library file.

As one implementation, when determining that the file header identifier contains the second identifier, the mobile terminal identifies the file indicated by the file header identifier as .so file.

At block 308, determine that a subdirectory of the Lib library directory to which the file indicated by the file header identifier containing the second identifier belongs supports an application binary interface (abi).

As one implementation, after identifying the .so file, the mobile terminal acquires the subdirectory of the Lib library directory to which the .so file belongs and determines that the subdirectory can be matched with the application binary interface, where the subdirectory can be matched with any of: arm64-v8a, armeabi-v7a, and armeabi of the application binary interface. If the subdirectory of the Lib library directory to which the .so file belongs supports any one of arm64-v8a, armeabi-v7a, and armeabi, it is determined that the subdirectory of the Lib library directory to which the .so file belongs supports the application binary interface.

At block 309, a file header identifier in the file directory is queried for according to the start tag position of the file directory and a file indicated by the file header identifier is identified via analyzing the file header identifier.

As one implementation, operations at blocks 309-312 relates to identifying, querying for, and copying of the native library file. The mobile terminal generates a file list by determining the file header identifier in the file directory, and identifies the file indicated by the file header identifier via analyzing the file header identifier.

At block 310, a capacity, the most recent modification time relative to the current time, and a check value of the file indicated by the file header identifier are acquired.

As one implementation, the capacity, the most recent modification time relative to the current time, and the check value of the file indicated by the file header identifier can be acquired. The capacity of the file indicated by the file header identifier can be a decompressed size of the file. For example, referring to a start position of the file header identifier, the decompressed size of the file indicated by the file header identifier can be acquired at a position which is offset by 22 bytes relative to the start position of the file header identifier, the most recent modification time relative to the current time of the file indicated by the file header identifier can be acquired at a position which is offset by 10 bytes relative to the start position of the file header identifier, and the check value of the file indicated by the file header identifier can be acquired at a position offset relative to the start position of the file header identifier by 14 bytes.

In one possible implementation, the check value of the file indicated by the file header identifier is a check value of cyclic redundancy check (CRC).

At block 311, whether the file indicated by the file header identifier is the same as a dynamic link library file contained in a Lib library directory is judged according to the capacity, the most recent modification time relative to the current time, and the check value of the file indicated by the file header identifier.

As one implementation, to judge whether the file indicated by the file header identifier is the same as the .so file contained in the Lib library directory, the capacity, the most recent modification time, and the check value of the file indicated by the file header identifier are compared with a capacity, the most recent modification time relative to the current time, and a check value of the dynamic link library file (.so file) contained in the Lib library directory. In addition, whether the .so file contained in the Lib library directory is modified or does not exist can also be judged. If the file indicated by the file header identifier is not the same as the .so file contained in the Lib library directory, it is determined that the .so file contained in the Lib library directory is modified or does not exist, advance to block 312; on the other hand, if the file indicated by the file header identifier is the same as the .so file contained in the Lib library directory, advance to block 313 and the scan process ends.

In one possible implementation, in addition to the Lib library directory, the .so file can also be contained in at least one of: a directory of data, a directory of applications (app), and a directory of an application package names.

At block 312, the file indicated by the file header identifier is depressed into the Lib library directory based on a judgment that the file indicated by the file header identifier is not the same as the dynamic link library file.

As one implementation, when determining that the file indicated by the file header identifier is not the same as the .so file contained in the Lib library directory, the mobile terminal determines that the .so file contained in the Lib library directory is modified or does not exist. In this case, the file indicated by the file header identifier can be depressed and then stored in the Lib library directory.

Moreover, the file indicated by the file header identifier can be decompressed into at least one of: the directory of the data, the directory of the applications, and the directory of the application package names.

At block 313, scan process ends.

It is to be noted that, operations at blocks 303-304 and 313, operations at blocks 305-308, and operations at blocks 309-313 may be performed in parallel. The disclosure is not particularly limited.

According to the implementation, when booting the mobile terminal or installing the application, the installation file and the end tag position of the file directory of the installation file are acquired first. And then, the start tag position of the file directory is determined according to the end tag position of the file directory. At last, the file header identifier in the file directory is queried for according to the start tag position of the file directory and the file indicated by the file header identifier is identified via analyzing the file header identifier. In this way, the process of decompressing all files in the installation file can be omitted. Consequently, it is possible to reduce scan time of the installation file before booting the mobile terminal or installing the application, and improve efficiency of booting the mobile terminal or installing the application.

Figure 4:
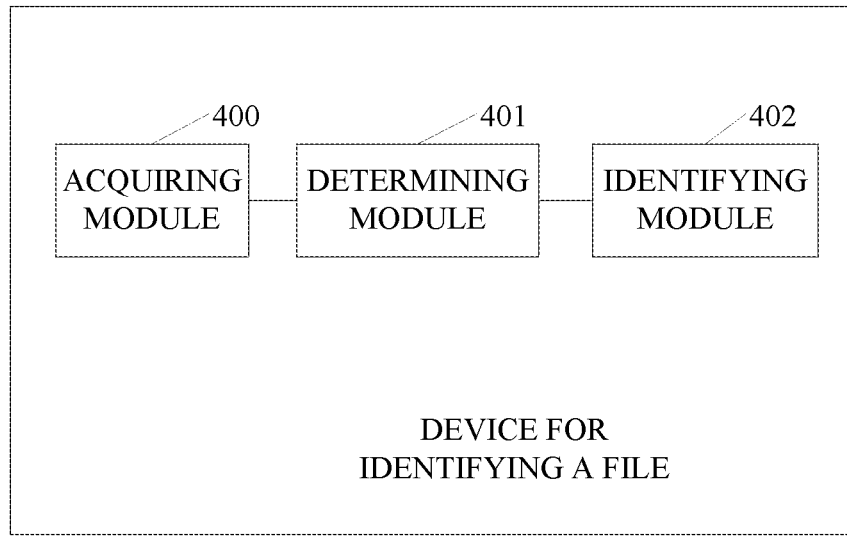
FIG. 4 is a schematic structural diagram illustrating a device for identifying a file according to an implementation of the disclosure.

FIG. 4 is a schematic structural diagram illustrating a device for identifying a file according to an implementation of the disclosure. The device illustrated in FIG. 4 can execute the methods illustrated in FIGS. 1-3. The disclosure will not be repeated herein. The device illustrated in FIG. 4 includes an acquiring module 400, a determining module 401, and an identifying module 402. The acquiring module 400, determining module 401, and identifying module 402 as well as other units depicted below may be integrated into a processing unit such as a processor, for example, processor 601 of FIG. 6.

The acquiring module 400 is configured to acquire an installation file and an end tag position of a file directory of the installation file.

The determining module 401 is configured to determine a start tag position of the file directory according to the end tag position of the file directory acquired by the acquiring module 400.

The identifying module 402 is configured to query for a file header identifier in the file directory according to the start tag position of the file directory determined by the determining module 401 and identify a file indicated by the file header identifier via analyzing the file header identifier.

As one implementation, when booting a mobile terminal or installing an application, the installation file of the application needs to be acquired and a structure of the file directory in a format of the installation file is extracted to achieve a partial scan. The applications are indicated by various files in the file directory. Various files are identified via scanning the file header identifier, of the file directory, for indicating each file. Consequently, the operation of decompressing all files in the installation file to identify a native library file and a RenderScript file can be omitted. As the installation file itself is a zip package, the end tag position of the file directory of the zip package can be acquired.

As one implementation, the mobile terminal can determine the start tag position of the file directory according to the end tag position of the file directory, so as to determine a position range of the file directory of the installation file in the binary format and the start tag position of the file directory in the binary.

As one implementation, after determining the position range of the file directory of the installation file in the binary format and the start tag position of the file directory in the binary format, all the file header identifiers for indicating files are queried for in a traversal way according to the start tag position of the file directory. After that, a file list is generated according to all the file header identifiers queried. The file indicated by the file header identifier is then identified via analyzing each file header identifier in the file list. After the process of analyzing each file header identifier is completed, the application can be initialized when booting the mobile terminal or installing the application.

Figure 5:
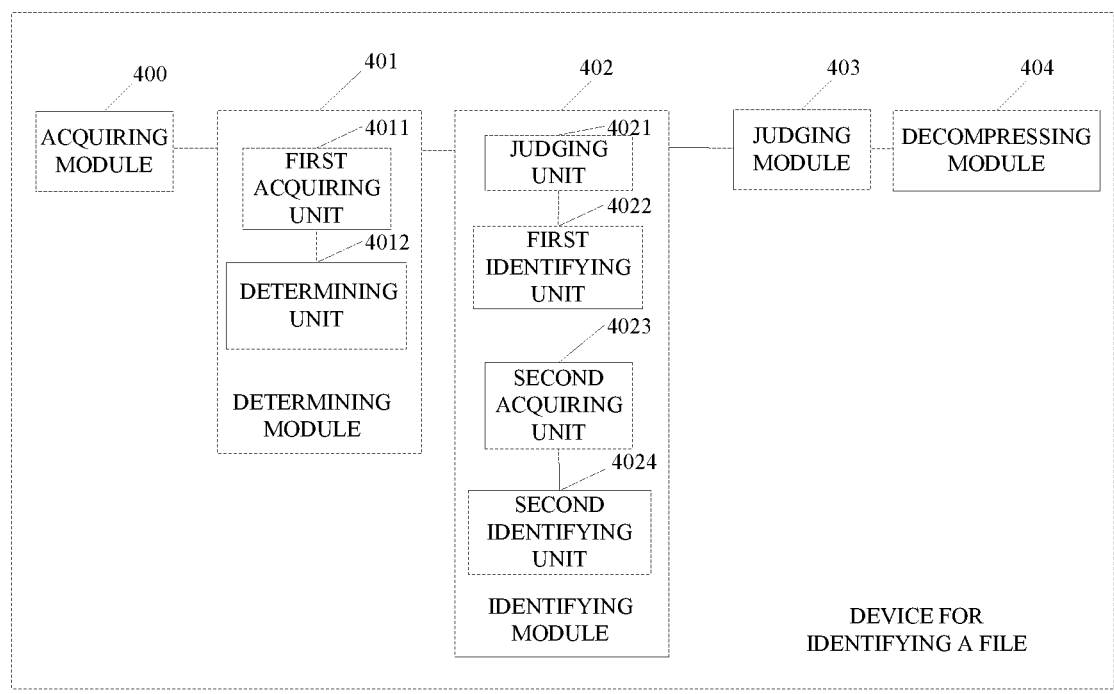
FIG. 5 is a schematic structural diagram illustrating another device for identifying a file according to an implementation of the disclosure.

As illustrated in FIG. 5, the determining module 401 includes a first acquiring unit 4011 and a determining unit 4012.

The first acquiring unit 4011 is configured to acquire a capacity of which the file directory occupies the installation file, and determine a distance between the file directory and a start position of the installation file according to the end tag position of the file directory and the capacity of which the file directory occupies the installation file.

The determining unit 4012 is configured to determine the start tag position of the file directory according to the distance between the file directory and the start position of the installation file.

As illustrated in FIG. 5, the identifying module 402 includes a judging unit 4021 and a first identifying unit 4022.

The judging unit 4021 is configured to judge whether the file header identifier contains a first identifier for indicating a RenderScript file.

The first identifying unit 4022 is configured to identify the file indicated by the file header identifier as the RenderScript file based on a judgment that the judging unit 4021 judges that the file header identifier contains the first identifier.

The acquiring module 400 is further configured to acquire a Lib library directory from the file directory.

The identifying module 402 includes a second acquiring unit 4023 and a second identifying unit 4024.

The second acquiring unit 4023 is configured to acquire the file header identifier containing a second identifier from the Lib library directory, where the second identifier is configured to indicate a dynamic link library file.

The second identifying unit 4024 is configured to identify the file indicated by the file header identifier containing the second identifier as the dynamic link library file.

The determining module 401 is further configured to determine that a subdirectory of the Lib library directory to which the file indicated by the file header identifier containing the second identifier belongs supports an application binary interface.

The acquiring module 400 is further configured to acquire a capacity, most recent modification time, and a check value of the file indicated by the file header identifier.

As illustrated in FIG. 5, the device further includes a judging module 403 and a decompressing module 404.

The judging module 403 is configured to judge whether the file indicated by the file header identifier is the same as a dynamic link library file contained in a Lib library directory according to the capacity, the most recent modification time, and the check value of the file indicated by the file header identifier.

The decompressing module 404 is configured to decompress the file indicated by the file header identifier into the Lib library directory based on a judgment that the judging module 403 judges that the file indicated by the file header identifier is not the same as the dynamic link library file.

The end tag position of the file directory of the installation file is at 0x06054b50 of the installation file in a binary format.

A position of the file header identifier is at 0x04034b50 of the installation file in a binary format.

The check value of the file indicated by the file header identifier is a check value of cyclic redundancy check (CRC).

The file indicated by the file header identifier is decompressed into at least one of: a directory of data, a directory of an application (app), and a directory of an application package name.

According to the implementation, when booting the mobile terminal or installing the application, the installation file and the end tag position of the file directory of the installation file are acquired first. And then, the start tag position of the file directory is determined according to the end tag position of the file directory. At last, the file header identifier in the file directory is queried for according to the start tag position of the file directory and the file indicated by the file header identifier is identified via analyzing the file header identifier. In this way, the process of decompressing all files in the installation file can be omitted. Therefore, scan time of the installation file before booting the mobile terminal or installing the application can be reduced, and efficiency of booting the mobile terminal or installing the application can be improved.

It is to be noted that, the above modules (the acquiring module 400, the determining module 401, the identifying module 402, the judging module 403, and the decompressing module 404) are configured to execute related operations of the methods in FIGS. 1-3.

In this implementation, the device is presented in the form of modules. "Module" herein can refer to an application-specific integrated circuit (ASIC), a processor and a memory for executing one or more software or firmware programs, an integrated logic circuit, and/or other components that can achieve the above described functions. In addition, the acquiring module 400, the determining module 401, the identifying module 402, the judging module 403, and the decompressing module 404 can be implemented by the processor 601 of the mobile terminal illustrated in FIG. 6.

Figure 6:
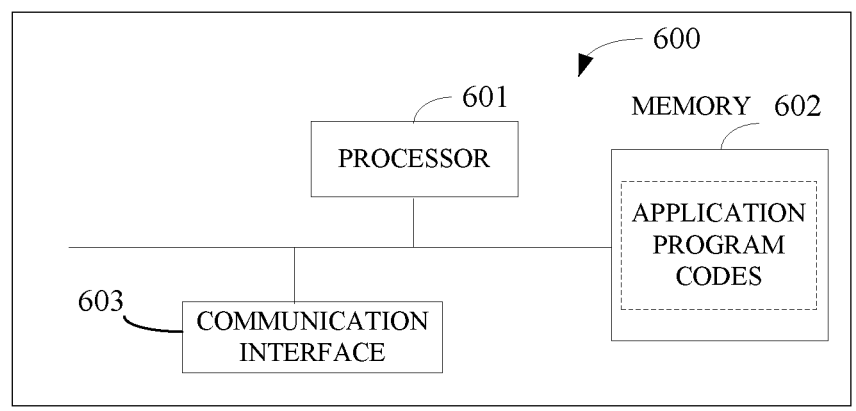
FIG. 6 is a schematic structural diagram illustrating a mobile terminal according to an implementation of the disclosure.

As illustrated in FIG. 6, a mobile terminal 600 can be configured by the structure illustrated in FIG. 6. The mobile terminal 600 includes at least one processor 601, at least one memory 602, and at least one communication interface 603. The processor 601, the memory 602, and the communication interface 603 are connected via a communication bus and achieve mutual communication.

The processor 601 can be a general-purpose central processing unit (CPU), a microprocessor, an application-specific integrated circuit (ASIC), or one or more integrated circuits for controlling execution of programs of the above schemes.

The communication interface 603 is configured to communicate with other devices or communication networks, such as an Ethernet, a radio access network (RAN), a wireless local area network (WLAN), and the like.

The memory 602 may be a read-only memory (ROM) or other types of static storage devices that can store static information and instructions, a random access memory (RAM) or other types of dynamic storage devices that can store information and instructions, or an electrically erasable programmable read-only memory (EEPROM), a compact disc read-only memory (CD-ROM), or other optical disk storage, optical disk storage (including compact discs, laser discs, optical discs, digital versatile discs, blue-ray discs, etc.), magnetic disk storage medium, or other magnetic storage devices, or any other mediums that can be used to carry or store desired program codes in the form of instructions or data structures and can be accessed by a computer. The disclosure is not limited thereto. The memory can be separated from the processor and connected to the processor via a bus. The memory can also be integrated with the processor.

The memory 602 is configured to store application program codes for executing the above schemes. The processor 601 is configured to execute the application program codes stored in the memory 602.

The application program codes stored in the memory 602 can be configured to execute the methods in FIGS. 1-3 executed by the above mobile terminal. For instance, an installation file and an end tag position of a file directory of the installation file are acquired. A start tag position of the file directory is determined according to the end tag position of the file directory. A file header identifier in the file directory is queried for according to the start tag position of the file directory and a file indicated by the file header identifier is identified via analyzing the file header identifier.

Implementations of the present disclosure also provide a computer readable storage medium. The computer readable storage medium can store programs which, when executed, can implement all or part of the operations of any of the methods described in the foregoing method implementations.

Implementations of the present disclosure also provide a computer program product. The computer program product includes a non-transitory computer readable storage medium that stores computer programs. The computer programs are operable with a computer to implement all or part of the operations of any of the methods described in the above method implementations. The computer program product may be a software installation package.

The above described device implementations are merely exemplary. The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations. Those of ordinary skill in the art can understand and implement the technical solutions without creative efforts.

The operations of the methods of the implementations of the present disclosure can be adjusted, combined, and deleted according to actual needs.

The modules or units of the devices of the implementations of the present disclosure can be combined, divided, and deleted according to actual needs.

The modules or units of the implementations of the present disclosure may be implemented as a general-purpose integrated circuit (such as a central processing unit, CPU) or as an application-specific integrated circuit (ASIC).

Through the description of the above implementations, those skilled in the art can clearly understand that various implementations can be implemented via software and a necessary universal hardware platform, or via hardware. Based on such understanding, the technical solutions of the present disclosure essentially, or the part of the technical solutions that contributes to the related art, or all or part of the technical solutions, may be embodied in the form of a software product which is stored in a computer readable storage medium (for example, a read-only memory (ROM), a random-access memory (RAM), Disk, compact disc (CD), or the like) and includes instructions for causing a computer device (which may be a personal computer, a server, or a network device and so on) to perform all or part of the operations described in the various implementations of the present disclosure.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for identifying a file, comprising:
   acquiring an installation file and an end tag position of a file directory of the installation file;
   determining a start tag position of the file directory according to the end tag position of the file directory; and
   querying for a file header identifier in the file directory according to the start tag position of the file directory and identifying a file indicated by the file header identifier via analyzing the file header identifier;
   wherein identifying the file indicated by the file header identifier via analyzing the file header identifier comprises:
      determining whether the file header identifier contains a first identifier for indicating a RenderScript file; and
      identifying the file indicated by the file header identifier as the RenderScript file based on a determination that the file header identifier contains the first identifier.

2. The method of claim 1, wherein the determining a start tag position of the file directory according to the end tag position of the file directory comprises:
   acquiring a capacity of which the file directory occupies the installation file, and determining a distance between the file directory and a start position of the installation file according to the end tag position of the file directory and the capacity of which the file directory occupies the installation file; and
   determining the start tag position of the file directory according to the distance between the file directory and the start position of the installation file.

3. The method of claim 1, further comprising:
   prior to identifying the file indicated by the file header identifier via analyzing the file header identifier, acquiring a Lib library directory from the file directory, wherein identifying the file indicated by the file header identifier via analyzing the file header identifier comprises:
   acquiring the file header identifier containing a second identifier from the Lib library directory, wherein the second identifier is configured to indicate a dynamic link library file; and
   identifying the file indicated by the file header identifier containing the second identifier as the dynamic link library file; and
   after the identifying a file indicated by the file header identifier via analyzing the file header identifier, determining that a subdirectory of the Lib library directory to which the file indicated by the file header identifier containing the second identifier belongs supports an application binary interface.

4. The method of claim 3, wherein a check value of the file indicated by the file header identifier is a check value of cyclic redundancy check (CRC).

5. The method of claim 1, further comprising:
   acquiring a capacity, the most recent modification time relative to a current time, and a check value of the file indicated by the file header identifier;
   determining whether the file indicated by the file header identifier is the same as a dynamic link library file contained in a Lib library directory according to the capacity, the most recent modification time relative to the current time, and the check value of the file indicated by the file header identifier; and
   decompressing the file indicated by the file header identifier into the Lib library directory based on a determination that the file indicated by the file header identifier is not the same as the dynamic link library file.

6. The method of claim 1, wherein the end tag position of the file directory of the installation file is at 0x06054b50 of the installation file in a binary format.

7. The method of claim 1, wherein a position of the file header identifier is at 0x04034b50 of the installation file in a binary format.

8. The method of claim 1, wherein the file indicated by the file header identifier is decompressed into at least one of: a directory of data, a directory of applications, and a directory of application package names.

9. The method of claim 1, wherein querying for the file header identifier in the file directory according to the start tag position of the file directory and identifying the file indicated by the file header identifier via analyzing the file header identifier comprising:
   determining a position range of the file directory in the installation file in a binary format, according to the start tag position,
   querying for, within the position range, all file header identifiers for indicating files in a traversal manner according to the start tag position;
   generating a file list according to all the file header identifiers queried; and
   identifying files indicated by the file header identifiers via analyzing each file header identifier in the file list.

10. A device for identifying a file, comprising:
    at least one processor; and
    a computer readable storage, coupled to the at least one processor and storing at least one computer executable instruction thereon which, when executed by the at least one processor, cause the device to:
       acquire an installation file and an end tag position of a file directory of the installation file;
       determine a start tag position of the file directory according to the end tag position of the file directory; and
       query for a file header identifier in the file directory according to the start tag position of the file directory and identify a file indicated by the file header identifier via analyzing the file header identifier;
    wherein the at least one computer executable instruction causing the device to identify the file indicated by the file header identifier via analyzing the file header identifier further causes the device to:
       determine whether the file header identifier contains a first identifier for indicating a RenderScript file; and
       identify the file indicated by the file header identifier as the RenderScript file based on a determination that the file header identifier contains the first identifier.

11. The device of claim 10, wherein the at least one computer executable instruction causing the device to determine the start tag position further causes the device to:
    acquire a capacity of which the file directory occupies the installation file, and determine a distance between the file directory and a start position of the installation file according to the end tag position of the file directory and the capacity of which the file directory occupies the installation file; and
    determine the start tag position of the file directory according to the distance between file directory and the start position of the installation file.

12. The device of claim 10, wherein the at least one computer executable instruction further causes the device to:
acquire a Lib library directory from the file directory;
wherein the at least one computer executable instruction causing the device to identify the file indicated by the file header identifier via analyzing the file header identifier further causes the device to:
acquire the file header identifier containing a second identifier from the Lib library directory, wherein the second identifier is configured to indicate a dynamic link library file; and
identify the file indicated by the file header identifier containing the second identifier as the dynamic link library file; and
the at least one computer executable instruction causing the device to determine the start tag position of the file directory further causes the device to:
determine that a subdirectory of the Lib library directory to which the file indicated by the file header identifier containing the second identifier belongs supports an application binary interface.

13. The device of claim 12, wherein a check value of the file indicated by the file header identifier is a check value of cyclic redundancy check (CRC).

14. The device of claim 10, wherein the at least one computer executable instruction further causes the device to:
acquire a capacity, the most recent modification time relative to a current time, and a check value of the file indicated by the file header identifier;
determine whether the file indicated by the file header identifier is the same as a dynamic link library file contained in a Lib library directory according to the capacity, the most recent modification time relative to the current time, and the check value of the file indicated by the file header identifier; and
decompress the file indicated by the file header identifier into the Lib library directory based on a determination that the file indicated by the file header identifier is not the same as the dynamic link library file.

15. The device of claim 10, wherein the end tag position of the file directory of the installation file is at 0x06054b50 of the installation file in a binary format.

16. The device of claim 10, wherein a position of the file header identifier is at 0x04034b50 of the installation file in a binary format.

17. The device of claim 10, wherein the file indicated by the file header identifier is decompressed into at least one of: a directory of data, a directory of applications, and a directory of application package names.

18. A non-transitory computer readable storage medium, storing a computer program which, when executed by a processor, causes the processor to:
acquire an installation file and an end tag position of a file directory of the installation file;
determine a start tag position of the file directory according to the end tag position of the file directory; and
query for a file header identifier in the file directory according to the start tag position of the file directory and identify a file indicated by the file header identifier via analyzing the file header identifier;
wherein the computer program which, when executed by the processor, causes the processor to identify the file indicated by the file header identifier via analyzing the file header identifier further causes the processor to:
determine whether the file header identifier contains a first identifier for indicating a RenderScript file; and
identify the file indicated by the file header identifier as the RenderScript file based on a determination that the file header identifier contains the first identifier.

* * * * *